Patented Feb. 18, 1941

UNITED STATES PATENT OFFICE 2,232,232

ARSONIC ACID AND PROCESS OF PREPARING IT

Walter Herrmann, Hans Hilmer, and Friedrich Hampe, Frankfort-on-the-Main Hochst, Germany, assignors to Winthrop Chemical Company, Inc., New York, N. Y., a corporation of New York No Drawing. Application October 3, 1938, Serial No. 233,094. In Germany October 4, 1937

4 Claims. (Cl. 260—443)

The present invention relates to arsonic acids, more particularly to arsonic acids having therapeutically valuable properties, and to a process of preparing them.

It is known that in cases of amoebic dysentery the 4-carbaminobenzene-1-arsonic acid shows a certain activity.

Now we have found that asymmetric ureas of the general formula

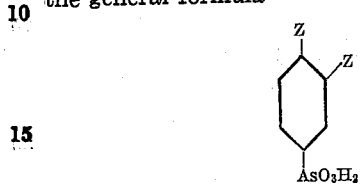

wherein one Z stands for hydrogen and the other Z for the radical:

wherein X stands for a member of the group consisting of hydrogen, lower alkyls and lower hydroxyalkyls and Y stands for a lower hydroxyalkyl, show a surprisingly more vigorous activity just in cases of amoebic dysentery.

Thus in experiments on cats suffering from amoebic dysentery it was found that of 50 animals treated with 50 milligrams of carbaminobenzene-para-arsonic acid only 65 per cent were influenced during the course of the disease and only 45 per cent were completely cured. In contrast, for instance 30 milligrams of the β-hydroxyethyl-carbaminobenzene-para-arsonic acid suffice in the treatment of 60 animals in an analogous manner, to influence 66 per cent and to cure completely 60 per cent of the animals. Besides, 11 cats were further treated prophylactically for 5 days with 30 milligrams per kilo 1 to 2 times daily and then infected with dysentery amoebae. Only one of the animals fell ill from amoebic dysentery and could be cured by further treatment without a relapse.

These compounds are obtained by either causing a carbethoxyaminobenzene-arsonic acid to react with a hydroxyalkyl amine or by melting an asymmetric aryl- or aminoaryl-hydroxyalkyl urea with arsenic acid or by diazotizing it and causing the diazo-compound to react with arsenious acid.

The following examples serve to illustrate the invention, but they are not intended to limit it thereto:

(1) 289 grams of carbethoxy-aminobenzene-para-arsonic acid are introduced, while stirring, into 350 grams of ethanolamine and the whole is heated for 8 hours to 110° C. After the mixture has been cooled it is introduced into water and the solution is rendered acid to congo paper with the aid of hydrochloric acid. The β-hydroxyethyl-carbaminobenzene-para-arsonic acid of the formula

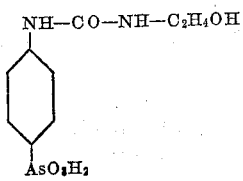

precipitated, is filtered with suction and recrystallized from hot water. It is a white crystalline powder which decomposes at 200° C.; it is readily soluble in alkalis and in hot water, sparingly soluble in alcohol and insoluble in ether and in benzene.

When carbethoxy-aminobenzene-meta-arsonic acid is used as starting material there is obtained a compound of the same therapeutical and solubility properties having the formula

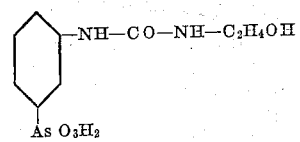

The same effect is attained by starting from such meta- or para-arsonic acids as have an alkyl radical, especially a methyl or ethyl radical, in the benzene nucleus. There is obtained, for instance, the product of the formula

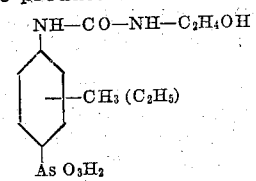

(2) 30 grams of carbethoxy-amino-4-hydroxy-benzene-1-arsonic acid are introduced, while stirring into 45 grams of ethanolamine and the whole is heated for 6 to 8 hours to 110° C. After the mixture has been cooled it is introduced into water as described in Example 1, the solution is precipitated with the aid of hydrochloric acid and the precipitate is purified by dissolving it in sodium acetate solution, filtering the solution through decolorizing charcoal and reprecipitating the compound with the aid of hydrochloric acid. The 3-hydroxyethyl-carbamino-4-hydroxybenzene-1-arsonic acid obtained has the formula

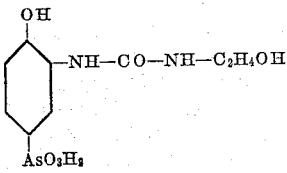

It is a feebly coloured crystalline powder which decomposes without melting when heated. It is readily soluble in alkalis, very sparingly soluble in alcohols and insoluble in other organic solvents.

Compounds of the same properties are obtained by heating 40 grams of 3-methoxy-4-hydroxy-5-carbethoxy-aminobenzene-1-arsonic acid or 35 grams of 3-chloro-4-hydroxy-5-carbethoxy-aminobenzene-1-arsonic acid with 75 grams of ethanolamine and further treating the reaction products as described above. The products obtained have the formulae

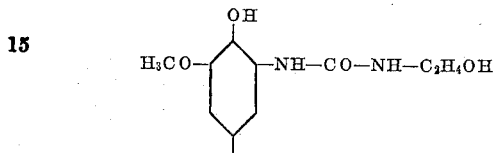

and

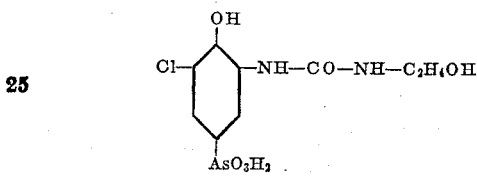

(3) 42 grams of 4-carbethoxy-amino-3-hydroxy-benzene-1-arsonic acid are introduced as described in the foregoing examples into 75 cc. of ethanolamine and the mixture is stirred for 6 to 8 hours at 110° C. The product is isolated in the manner prescribed in the foregoing examples. The 4 - hydroxyethyl - carbamino-3-hydroxybenzene-1-arsonic acid of the formula

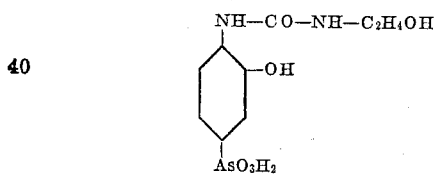

when recrystallized from water, is a white crystalline powder which decomposes at 237° C. It is soluble in alkalis and in hot water, sparingly soluble in alcohol and insoluble in other organic solvents.

(4) In the same manner 45 grams of carbethoxy-aminobenzene-para-arsonic acid are caused to react with 90 grams of aminopropandiol prepared according to Knorr "Berichte der Deutschen Chemischen Gesellschaft", vol. 32, page 752. The 2,3 - dihydroxypropyl - carbaminobenzene - para-arsonic acid of the formula

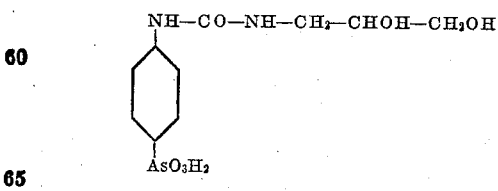

is a white powder readily soluble in alkalis, sparingly soluble in alcohol and insoluble in other organic solvents.

(5) 29 grams of carbethoxy-aminobenzene-para-arsonic acid are introduced into 70 grams of 3 - diethylamino - 2 - hydroxypropyl-1-amine and the whole is heated for 9 hours to 110° C. The molten mass introduced into a small portion of water is mixed by stirring with acetone whereby the salt of the 3-diethylamino-2-hydroxypropyl-carbaminobenzene-para-arsonic acid is precipitated. The free arsonic acid of the formula

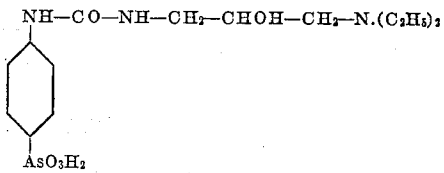

may be obtained by reducing the salt to obtain the arseno-benzene which is separated and re-oxidized. The acid is a white crystalline powder readily soluble in acids and bases which when heated decomposes without melting.

(6) 40 grams of carbethoxy-methyl-aminobenzene-para-arsonic acid are heated together with 75 cc. of ethanolamine for 6 to 8 hours to 110° C. The reaction product is isolated in the same manner as described in Examples 1 to 4. The hydroxyethyl-carbo-methylamino-benzene-para-arsonic acid of the formula

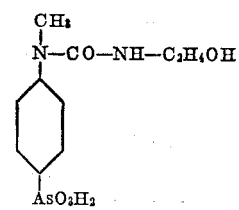

is a white powder sparingly soluble in water which when heated decomposes without melting. It is sparingly soluble in alcohol and insoluble in other organic solvents.

In the same manner carbethoxy-hydroxyethylamino-benzene-para-arsonic acid prepared by causing hydroxyethyl-aminobenzene-para-arsonic acid to react with chloroformic acid ester may be caused to react with ethanol amine to obtain the hydroxyethyl - carboxyethyl - aminobenzene-para-arsonic acid of the formula

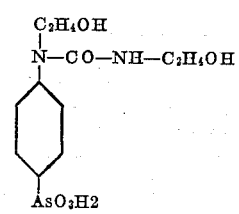

We claim:
1. The products of the following general formula

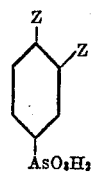

wherein one Z stands for one of a group consisting of hydrogen and hydroxy and the other Z for the radical

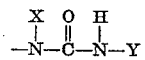

wherein X stands for a member of the group consisting of hydrogen, lower alkyls and lower hydroxyalkyls and Y stands for a lower hydroxyalkyl.

2. The product of the following formula:
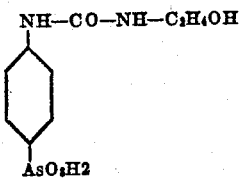
3. The product of the following formula:
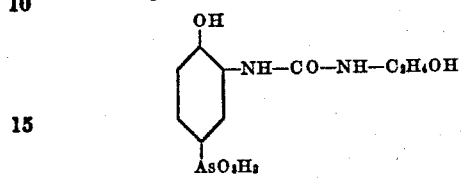
4. The product of the following formula:
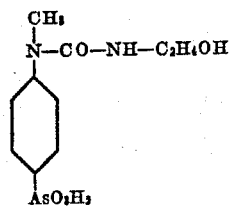
WALTER HERRMANN.
HANS HILMER.
FRIEDRICH HAMPE.